United States Patent
Kim (10) Patent No.: US 9,215,045 B2
(45) Date of Patent: *Dec. 15, 2015

(54) SYSTEM AND METHOD OF DETECTING AND LOCATING INTERMITTENT ELECTRICAL FAULTS IN ELECTRICAL SYSTEMS

(75) Inventor: Charles J. Kim, Annandale, VA (US)

(73) Assignee: Howard University, Washington, DC (US)

( * ) Notice: Subject to any disclaimer, the term of this patent is extended or adjusted under 35 U.S.C. 154(b) by 542 days.

This patent is subject to a terminal disclaimer.

(21) Appl. No.: 13/355,660

(22) Filed: Jan. 23, 2012

(65) Prior Publication Data

US 2012/0119753 A1    May 17, 2012

Related U.S. Application Data

(63) Continuation of application No. 12/262,664, filed on Oct. 31, 2008, now Pat. No. 8,102,779.

(51) Int. Cl.
*H04J 3/14* (2006.01)
*H04L 1/24* (2006.01)
*H04L 1/00* (2006.01)

(52) U.S. Cl.
CPC ............ *H04L 1/24* (2013.01); *H04L 2001/0095* (2013.01)

(58) Field of Classification Search
USPC .......................... 370/216–228, 242–248, 521
See application file for complete search history.

(56) References Cited

U.S. PATENT DOCUMENTS

| | | |
|---|---|---|
| 4,022,988 A | 5/1977 | Lentz et al. |
| 4,414,539 A | 11/1983 | Armer |
| 4,868,826 A | 9/1989 | Smith et al. |
| 4,887,041 A | 12/1989 | Mashikian |
| 4,929,887 A | 5/1990 | Robitaille et al. |
| 5,029,274 A | 7/1991 | Goff |
| 5,237,511 A | 8/1993 | Caird et al. |
| 5,448,176 A | 9/1995 | Mashikian |
| 5,600,248 A | 2/1997 | Westrom |
| 5,623,170 A | 4/1997 | Bartel |
| 5,682,100 A | 10/1997 | Rossi et al. |
| 5,715,407 A | 2/1998 | Barth |

(Continued)

FOREIGN PATENT DOCUMENTS

| | | |
|---|---|---|
| FR | 2907910 | 5/2008 |
| JP | 11239160 | 8/1999 |

(Continued)

OTHER PUBLICATIONS

International Search Report dated Dec. 14, 2010 relating to PCT/US2010/034228.

(Continued)

*Primary Examiner* — Phuc Tran
(74) *Attorney, Agent, or Firm* — Fitch, Even, Tabin & Flannery LLP (57) ABSTRACT

Signals are transmitted from at least one transmitter that is positioned in an electrical network. The signals that have been transmitted are received a single receiver positioned within the electrical network. At the single receiver, the received signals are analyzed and a determination from the analyzing the received signals is made as to whether a fault has occurred in the electrical network and the approximate location of the fault.

4 Claims, 7 Drawing Sheets

(56) References Cited

U.S. PATENT DOCUMENTS

| | | | |
|---|---|---|---|
| 5,729,144 | A | 3/1998 | Cummins |
| 5,784,393 | A | 7/1998 | Byers |
| 5,790,537 | A | 8/1998 | Yoon et al. |
| 6,181,140 | B1 | 1/2001 | Vokey |
| 6,198,401 | B1 | 3/2001 | Newton et al. |
| 6,313,642 | B1 | 11/2001 | Brooks |
| 6,385,561 | B1 | 5/2002 | Soraghan |
| 6,477,475 | B1 | 11/2002 | Takaoka et al. |
| 6,646,447 | B2 | 11/2003 | Cern |
| 6,725,176 | B1 | 4/2004 | Long et al. |
| 6,759,851 | B2 | 7/2004 | Hazelton |
| 6,842,011 | B1 | 1/2005 | Page |
| 6,856,936 | B1 | 2/2005 | Chen |
| 6,868,357 | B2 | 3/2005 | Furse |
| 6,917,888 | B2 * | 7/2005 | Logvinov et al. .............. 702/59 |
| 6,927,579 | B2 | 8/2005 | Blades |
| 6,934,655 | B2 | 8/2005 | Jones |
| 6,965,303 | B2 | 11/2005 | Mollenkopf |
| 6,972,574 | B2 | 12/2005 | Allan |
| 7,286,041 | B2 | 10/2007 | Enrico |
| 7,319,574 | B2 | 1/2008 | Engel |
| 7,368,919 | B2 | 5/2008 | Gervais |
| 7,432,720 | B1 | 10/2008 | Quaife |
| 7,800,744 | B2 * | 9/2010 | Lai et al. .................... 356/73.1 |
| 7,812,617 | B2 | 10/2010 | Hofman |
| 7,999,667 | B2 | 8/2011 | Carralero |
| 8,102,779 | B2 * | 1/2012 | Kim .............................. 370/242 |
| 2002/0062460 | A1 | 5/2002 | Okuda |
| 2003/0085715 | A1 | 5/2003 | Lubkeman et al. |
| 2003/0125893 | A1 | 7/2003 | Furse |
| 2003/0177235 | A1 * | 9/2003 | Grammel ..................... 709/225 |
| 2003/0222747 | A1 | 12/2003 | Perkinson et al. |
| 2004/0017203 | A1 | 1/2004 | Becker |
| 2004/0066313 | A1 | 4/2004 | Ong |
| 2005/0049754 | A1 | 3/2005 | Ogawa |
| 2005/0231326 | A1 | 10/2005 | Enrico |
| 2005/0289408 | A1 | 12/2005 | Jani et al. |
| 2006/0012376 | A1 | 1/2006 | Furse |
| 2006/0061325 | A1 | 3/2006 | Tang et al. |
| 2006/0061368 | A1 | 3/2006 | Furse |
| 2006/0121321 | A1 | 6/2006 | Laukhuf |
| 2006/0176629 | A1 | 8/2006 | Graube |
| 2007/0191987 | A1 | 8/2007 | Dang et al. |
| 2007/0202839 | A1 | 8/2007 | Abraham et al. |
| 2007/0217414 | A1 | 9/2007 | Berkman et al. |
| 2007/0223165 | A1 | 9/2007 | Itri et al. |
| 2008/0054741 | A1 | 3/2008 | Oyama |
| 2008/0062408 | A1 * | 3/2008 | Lai et al. .................... 356/73.1 |
| 2008/0183424 | A1 | 7/2008 | Seem |
| 2008/0273527 | A1 | 11/2008 | Short et al. |
| 2009/0045925 | A1 | 2/2009 | Demin et al. |
| 2009/0083583 | A1 | 3/2009 | Seem |
| 2009/0144023 | A1 | 6/2009 | Seem |
| 2009/0228223 | A1 | 9/2009 | Liu et al. |
| 2010/0100259 | A1 | 4/2010 | Geiter |
| 2010/0110828 | A1 | 5/2010 | Russo et al. |
| 2010/0110900 | A1 | 5/2010 | Kim |
| 2010/0111521 | A1 | 5/2010 | Kim |
| 2010/0171630 | A1 | 7/2010 | Carralero et al. |
| 2010/0183258 | A1 * | 7/2010 | Chow et al. .................... 385/12 |
| 2010/0232298 | A1 | 9/2010 | Karam |
| 2010/0284117 | A1 * | 11/2010 | Crane ......................... 361/93.1 |
| 2011/0061015 | A1 | 3/2011 | Drees |
| 2011/0178977 | A1 | 7/2011 | Drees |
| 2011/0242989 | A1 | 10/2011 | Kim |
| 2012/0119753 | A1 | 5/2012 | Kim |
| 2012/0259583 | A1 | 10/2012 | Noboa |

FOREIGN PATENT DOCUMENTS

| | | |
|---|---|---|
| JP | 2002158668 | 5/2002 |
| WO | 2006120757 A1 | 11/2006 |

OTHER PUBLICATIONS

Sandia Report; Unlimited Release, Printed Sep. 2006 R. Kevin Howard, Steven F. Glover, Gary E. Pena, Matthew B. Higgins, Larry X. Schneider and Thomas R. Lockner (38 pgs.).

IBEE Sensors Journal, vol. 5, No. 6, Dec. 2005; Feasibility of Spread Spectrum Sensors for Location of Arcs on Live Wires Cynthia Furse, Senior Member, IEEE, Paul Smith, Member, IEEE, Mehdi Safavi, and Chet Lo, Member, IEEE (6 pgs.).

International Search Report dated Dec. 22, 2009 relating to PCT/US2009/061779.

V.B. Prasad, "The Effects of Intermittent Faults in the Reliability of Digital Systems", IEEE Southeastern '90. Proceedings, vol. 3. pp. 948-952, Apr. 1990.

I. Hakki Cavdar, "Performance Analysis of FSK Power Line Communications Systems Over the Time-Varying Channels: Measurements and Modeling", IEEE Transactions on Power Delivery, vol. 19, issue 1, pp. 111-117, Jan. 2004.

Chun-Hung Liu, Eric Wade, and H. Harry Asada, "Reduced-Cable Smart Motors Using DC Power Line Communication", IEEE International Conference on Robotics and Automation, Proceedings, vol. 4., pp. 3831-3838, 2001.

Paul Smith, Cynthia Furse, and Jacob Gunther, "Analysis of Spread Spectrum Time Domain Reflectometry for Wire Fault Location", IEEE Sensors Journal, vol. 5, No. 6, Dec. 2005.

Slenski, G.A., Walz, M.F., "Novel Technologies for Improving Wire System Integrity", Ninth Aging Aircraft Conference, Atlanta, Mar. 6-9, 2006.

Charles Kim and Nicholas Johnson, "Detection of Intermittent Faults in Aircraft Electrical Wire by Utilizing Power Line Communication", 9th joint FAA/DOD/NASA Conference on Aging Aircraft, Mar. 7, 2006, Atlanta, GA.

V. Taylor, and M. Faulkner, "Line Monitoring and Fault Location Using Spread Spectrum on Power Line Carrier", IEE Electronics Letters, vol. 143, issue 5, pp. 427-434, Sep. 1996.

"ST7537HS1"—Home Automation Modem, SGS-Thomson Microelectronics, 1995.

"Power Line Modem Application—Remote Control Using ST7537 and ST6:Application Note", SGS-Thomson Microelectronics, 1994.

"ST7357—Power Line Application Modem Application Note", SGS-Thomson Microelectronics, 1995.

Charles Kim and Michael Carraleo, "Functionality Test of PLC Data Error Approach for Detecting Intermittent Faults", 11th joint FAA/DOD/NASA Conference on Aging Aircraft, Apr. 21-24, 2008.

International Search Report dated Dec. 14, 2009 relating to PCT/US2009/061770.

International Search Report dated Oct. 30, 2012 relating to PCT/US2012/033543.

Supplementary European search report from European Application No. 12774777.2 dated Nov. 10, 2014, 6 pages.

Charles Kim, "Detection and Location of Intermittent Faults by Monitoring Carrier Signal Channel Behavior of Electrical Interconnection System", Electric Ship Technologies Symposium, IEEE, pp. 449-455, Apr. 20, 2009.

European Patent Office Extended European Search Report dated Apr. 10, 2015 for European Application No. 09824037.7, 9 pages.

European Patent Office Extended European Search Report dated Feb. 19, 2015 for European Application No. 12774777.2, 13 pages.

* cited by examiner

| Fig. 7a | Fig. 7b |

SYSTEM AND METHOD OF DETECTING AND LOCATING INTERMITTENT ELECTRICAL FAULTS IN ELECTRICAL SYSTEMS

CROSS REFERENCE TO RELATED APPLICATIONS

This application is a continuation of U.S. application Ser. No. 12/262,664 entitled "Housing Arrangement for a Fault Determination Apparatus and Method of Installing the Same" naming Charles Kim as inventor, and filed on Oct. 31, 2008, the content of which is incorporated herein by reference in its entirety.

FIELD OF THE INVENTION

This application relates to approaches for detecting and/or locating electrical faults in electrical systems or networks.

BACKGROUND

Intermittent electrical faults are physical events that manifest themselves occasionally and in often unpredictable ways within electrical systems or networks. When an intermittent fault occurs in a system, the system may produce erroneous results or could fail. To take some specific examples of particular electrical faults that occur in networks, a wire may rub against a neighboring wire and a small electrical arc may be created as a result of the contact. In another example, a clamp may break through the insulation surrounding the wire and touch the wire creating a fault. In yet another example, a wire may break at the back end of a connector thereby creating a fault. In still another example, corrosion may create intermittent non-contact between wires and pins within a given system. In another example, cracks on wires within the system may have water dripping on them (or the wires may be in contact with other substances) thereby creating electrical faults. Internal coil turn-to-turn insulation in electric machines may also fail in systems with electrical coils creating electrical faults.

The consequences of intermittent electrical faults can be severe and, in many instances, can cause substantial damage to the electrical equipment, can result in injury to users, or can even cause the loss of human life. For instance electrical fires may be sparked because of the occurrence of some electrical faults. When the faults occur in aircraft, fuel tank explosions may occur if electrical faults occur near a fuel tank. Even if catastrophic damage or injury does not occur, the operational lifetime of machines or systems may be reduced as the result of the occurrence of intermittent electrical faults. One characteristic of intermittent faults is that they are random and unpredictable. Their recurrence is also unpredictable. However, if an intermittent fault is left undetected and un-repaired, a major, disastrous, and permanent fault might follow that may cause deaths, failures, or destruction.

Previous attempts at identifying electrical faults have relied upon the visual or instrument-aided inspection of electrical systems. However, various disadvantages exist with these previous approaches. For example, the operation of the system frequently had to be suspended to determine if a fault existed thereby causing various problems such as loss of revenue for the owner or operator of the system. Moreover, many locations within existing systems were frequently hard to reach and/or observe thereby severely limiting the effectiveness of these approaches. These previous approaches also proved unable to detect the fault in many cases since the duration of the fault was often short and the system would behave normally as if nothing happened after this short-lived intermittent fault event. Therefore, it was relatively easy for the observer to miss the occurrence of the fault. Additionally, these approaches often relied upon intrusive placement of any equipment used frequently leading to at least some disruption of the existing system.

Other previous approaches relied upon transmitting electromagnetic waves across the network being observed. In one previous example, pulses were transmitted in networks and any reflections were analyzed to determine if a fault existed. More specifically, incident standing waves or impulses were transmitted and then reflected in the network, and then the time between the incident pulse and the reflected pulse was calculated to determine the distance to the location where the pulse was reflected. Different criteria were then used to determine if the reflection was a potential fault. One problem with this technique was that any change in the wire material (e.g., a branch-out in the network) reflected the incident waves resulting in erroneous fault determination. Another problem with this technique was that it required the transmission of high voltage pulses, which some electrical systems with thin coils (e.g., with short wires or thin windings) could not endure. Another time domain reflectometry method employed spread-spectrum techniques, but this approach did not solve the above-mentioned problems since high voltage pulse transmission was still required and reflection still occurred on branches of the electrical network.

Another previous approach transmitted direct-sequence spread-spectrum modulated signals, instead of high voltage signals, and employed signal processing techniques in an attempt to find and locate electrical faults. These approaches, however, still relied on reflectometry that is, sending incident signal and receiving reflected signal and the timing of them for distance calculation. As a result, although this approach may have, under some circumstances, overcome the need to use high voltage incident voltage pulses, it still had the problem of reflection occurring at all points of branching in the network and in the devices that were connected.

Still another problem of the reflectometry approach was that the location of the device must be close to one end of the electrical system, either the line end or the source end. Otherwise, the injected signal would be reflected from both ends and result in a combined, distorted, and reflected signal. This requirement of locating the device at either end is very difficult to meet since many electrical networks are connected in a complicated format, often in a mesh architecture.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE PREFERRED EMBODIMENTS

Approaches are provided to detect the presence and locations of faults within an electrical network. The approaches utilize one or more transmitters to send signals (e.g., packets) to one receiver and, based upon the mismatch between the signal sent and the signal received at the receiver due to the distortion in the signal transmission caused by the transient of intermittent fault, to determine the presence and/or location of electrical faults. The approaches described herein are easy and cost effective to use, do not rely upon the transmission of high voltage signals, can be installed at any location within the electrical network, are an effective detection solution for the unpredictable intermittent event of faults that occur between transmitter and receiver, and are not susceptible to the false fault indications obtained in previous approaches.

In many of these embodiments, signals are transmitted from a plurality of transmitters that are positioned in an electrical network. The signals transmitted by the transmitters are received at a single receiver positioned within the electrical network. At the single receiver, the received signals are analyzed and it is determined from the analysis of the received signals whether a fault has occurred in the electrical network between transmitters and receiver. The location of the fault may also be determined.

In some examples, a random pause duration is inserted between successively transmitted signals. Each of the plurality of transmitters has an associated unique combination of bits that uniquely identifies the transmitter and the unique combination bits is included in the signals sent to the receiver. The receiver analyzes the received combination of bits and compares the combination of bits to an expected combination of bits (expected to be received from the transmitter) and when there is not a match, determines that an electrical fault exists in the segment of the electrical network between the transmitter and the receiver. The location of the electrical fault may also be determined based upon the analysis.

In other examples, each of the plurality of transmitters receives a command signal from the single receiver. Each transmitter only transmits signals to the single receiver when the command signal has been received at the selected transmitter. The total absence of an expected message from a transmitter or the mismatching of any message received (compared to an expected value) of a message sent in response to the command signal indicates the existence of open circuit or potential faults.

Figures 1, 2:
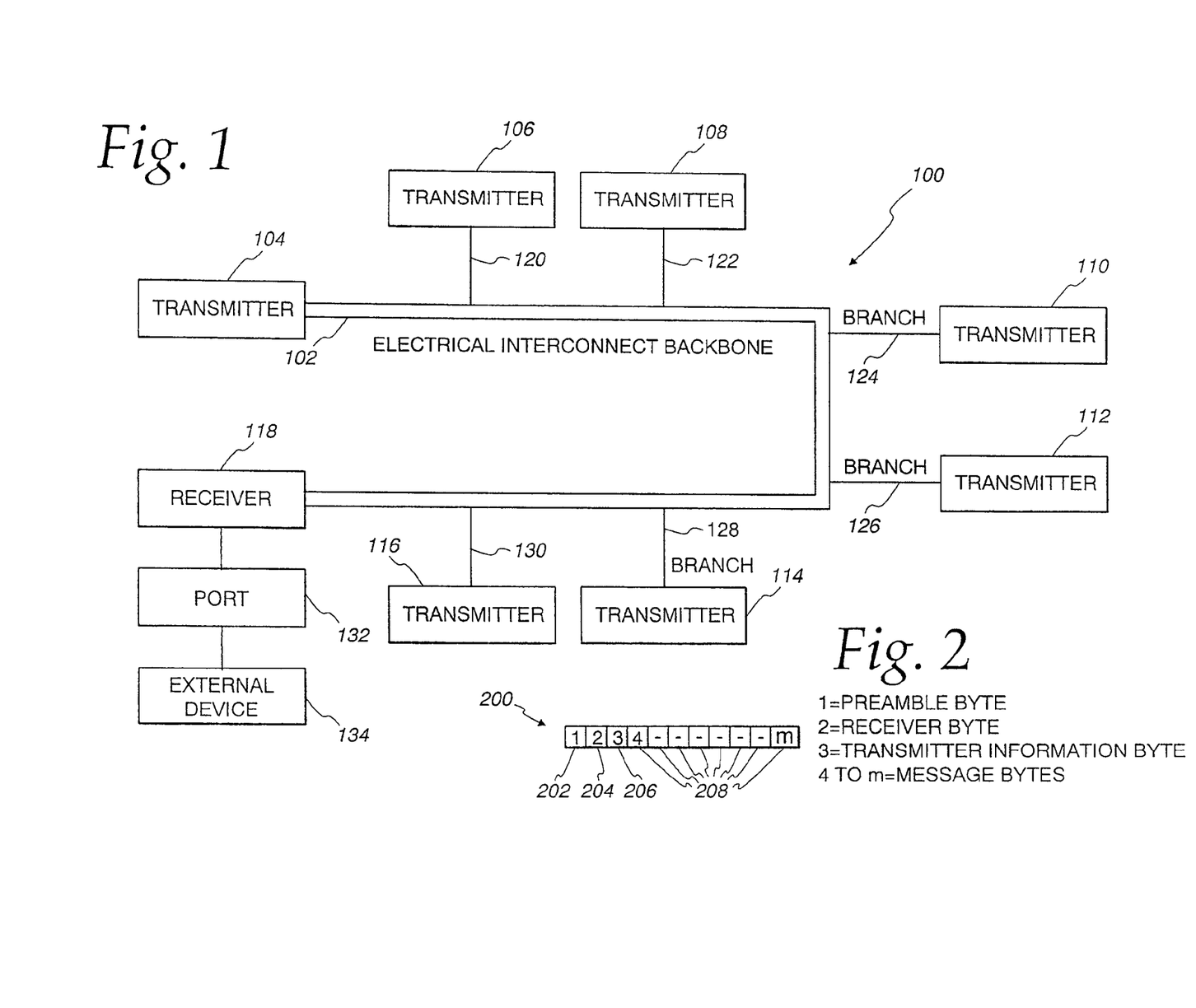
FIG. 1 comprises a block diagram of a fault determination system according to various embodiments of the present invention.
FIG. 2 comprises one example of a byte-map for use in a fault determination system according to various embodiments of the present invention.

Referring now to FIG. 1, one example of an approach for determining and detecting electrical faults in an electrical network 100 is described. An electrical interconnect backbone 102 is coupled to transmitters 104, 106, 108, 110, 112, 114 and 116 via electrical branches 120, 122, 124, 126, 128 and 130 respectively. The electrical interconnect backbone 102 is also connected to a receiver 118. The electrical interconnect backbone 102 may be any type of electrical connection of any voltage level or any current type (e.g., direct or alternating). For instance, the backbone 102 may include two wires (e.g., one ground and the other a wire transmitting a DC current and voltage). Other examples of backbone arrangements and any number of electrical wires are possible to distribute electrical power. In one example, electrical sources having voltages of approximately 100 vRMS (or 28V DC) are distributed across the backbone 102 and the branches of the network 100.

The transmitters 104, 106, 108, 110, 112, 114 and 116 are any type of device capable of transmitting any type of modulated communication signal, over electrical circuit 102 without compromising the power delivering function of the electrical network 102, that includes any type of information. For example, the transmitters 104, 106, 108, 110, 112, 114 and 116 may include controllers to form packets or messages, modems to convert the messages to suitable signals through modulation (e.g., having the proper voltage levels) for transmission, and a coupling network to provide filtering and protective functions to connect any of the transmitters to the electrical interconnect backbone 102. As mentioned, the transmitters 104, 106, 108, 110, 112, 114 and 116 may operate and transmit packets or messages at any voltage level appropriate for the electrical interconnect backbone 102.

The receiver 118 is any device capable of receiving modulated communication signals from any of the transmitters 104, 106, 108, 110, 112, 114 and 116 via the electrical interconnect backbone 102. As with the transmitters 104, 106, 108, 110, 112, 114 and 116, the receiver 118 may include a controller, a modem and a coupling network. As mentioned, the coupling network buffers the receiver or transmitter from the electrical interconnect backbone 102 by a filtering function so that the receiver or transmitter insulates it from the high voltages of the electrical network while effectively sending and receiving the modulated signal. The modem in the transmitter modulates the digital signal formed by the controller and the modulated signal travels through the coupling network into the electrical network. The modem in the receiver accepts the modulated signal via the coupling network sent from the transmitters, demodulates the signals into a digital byte format, and sends the digital data to its controller. The receiver controller processes the signals for data errors or mismatch to determine whether a fault has been detected or the likelihood that a fault has been detected and/or the possible location of faults. Various error rates can be determined from the process.

The receiver 118 communicates with a port 132 and the port 132 is coupled to an external device 134. The external device 134 may be a personal computer, display, enunciator or any other type of device that is capable of alerting a user that a fault has been detected somewhere in the network 100. The location of faults and message error rate calculated for the location may also be displayed to give the severity (likelihood) or status of the fault progress. In an alternative approach, the external device 134 may provide some or all of the fault determination processing capabilities rather than the receiver 118 when the receiver 118 is limited to provide the mismatch or error occurrence only.

In one example of the operation of the system of FIG. 1, the transmitters 104, 106, 108, 110, 112, 114 and 116 transmit messages to the receiver 118. The receiver 118 analyzes the messages that it receives and based upon the results of the analysis determines whether a fault exists, the likelihood that a fault exists, and/or the possible (or determined) location(s) of faults (e.g., within a particular branch 120, 122, 124, 126 and 128 or 130 of the network 100). It will be appreciated that although a single receiver is shown in the example of FIG. 1, any number of receivers may be used in the network 100. Additionally, any number of transmitters may be employed in the network 100.

Once errors are detected and/or their locations determined remedial action can be taken. For example, a user can access the potential site of the error, determine if a problem exists, and, if a problem exists remedy the problem (e.g., replace a wire).

Referring now to FIG. 2, one example of a message format for messages transmitted according to the approaches described herein is described. A message or packet 200 includes a preamble byte 202, a receiver information byte 204, a transmitter information byte 206, and 4 to m message bytes 208 where m is an integer greater than 4. In one approach, each transmitter within the system (e.g., transmitters 106, 108, 110, 112, 114, or 116 of FIG. 1) has a uniquely identifiable message byte (e.g., some unique pattern of binary ones and zeros) that is known to the receiver and that uniquely identifies a transmitter (e.g., the receiver 118 of FIG. 1). All information in the message or packet 200 is included in the data stream that is transmitted to the receiver.

To detect an error or fault, in one approach, the receiver compares the data received from the transmitter against pre-assigned data that it has stored regarding each transmitter. In the case of a mismatch between the received data and the expected data, a fault is potentially detected. The non-reception at the receiver of an expected message or packet expected to be sent from the transmitter may also indicate the existence of a fault in the form of open circuit in the network.

For transmissions across the network, various approaches may be used to ensure signal integrity (e.g., to ensure signals sent by multiple transmitters do not interfere with each other). In any approach used, the modem of each transmitter monitors the wire via a "carrier detect" approach that detects if there are any modulated signals on the wire, and waits to send its signal until there is no signal on the wire. Therefore, at any one moment, only one transmitter is allowed to send signals. In one approach, multiple transmitters send signals without the control of the receiver. To ensure signal integrity, a random pause duration is inserted after each signal transmission. Each transmitter has an equal chance to send a signal to the receiver and, therefore, each wire segment (e.g., each branch of the network) is monitored at the same priority with an equal chance of detecting errors compared with any other electrical branch.

In another approach that may be used to achieve signal arbitration, only a transmitter that is ordered by the receiver is allowed to send a signal. In other words, the receiver is the master of this single-master and multiple-slave protocol. The receiver sends a message or packet (e.g., a command) to a transmitter, for example, the message of FIG. 2. After the transmitter receives the message or packet from the receiver, this message is copied and sent back to the receiver. The comparison of the received message at the receiver against the sent message determines if there is an error in the signal, which in turn indicates that a fault exists in the wire segment between the receiver and the commanded transmitter. In some approaches and as described elsewhere herein, an error is detected if no return message is detected by the receiver (e.g., within a predetermined amount of time), indicating possible disconnected, open circuit.

Figure 3:
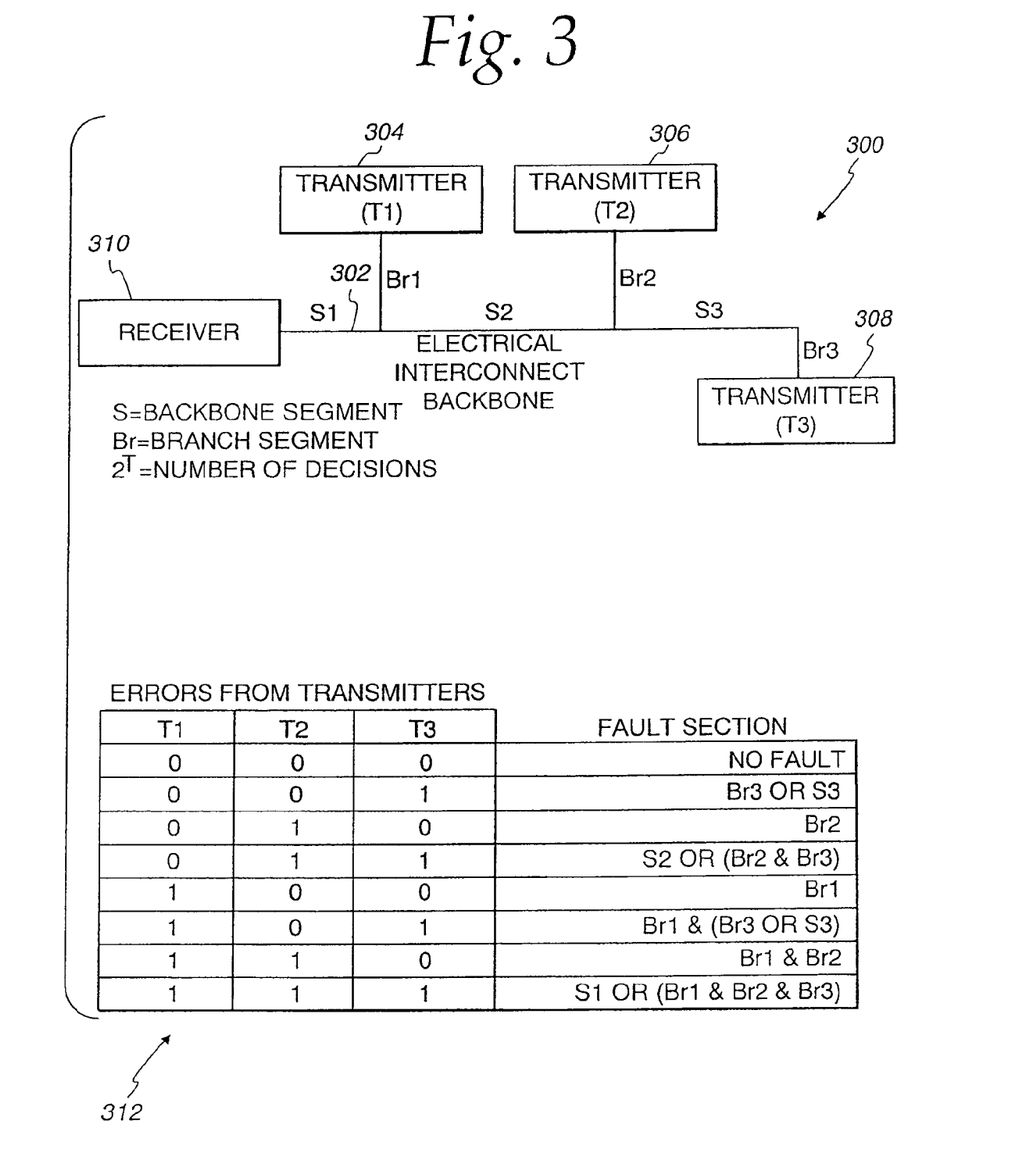
FIG. 3 comprises a block diagram and fault determination table illustrating one approach for fault determination according to various embodiments of the present invention.

Referring now to FIG. 3, one example of using these approaches to detect an error or fault in a network 300 is described. In this example, an electrical backbone 302 is coupled to transmitters 304, 306 and 308 and a receiver 310. The network 300 is divided into segments S1, S2 and S3 and branches Br1, Br2 and Br3.

A table 312 is stored in a memory at the receiver and used to determine the possible location or locations of electrical faults within the network 300. For example, using the techniques described herein, it is determined if a particular error exists in one of the branches associated with a particular transmitter. For example, the mismatch of expected data from the transmitter 304 versus expected data, while there is no mismatch from the transmitters 306 and 308, may indicate that a fault exists in branch Br1.

To take a few examples and utilizing the table 312, if no errors are determined for transmitters 304, 306 and 308, no fault exists in the network. In another example, if no errors are detected at transmitters 304 and 308, but an error is detected at transmitter 306 then a fault may exist at segment S2 and/or both branches Br2 and Br3. It will be appreciated that the table 312 may be any type of data structure and is also not limited to the format shown in FIG. 3. Moreover, the examples shown in table 312 may vary depending upon the placement of the transmitters and the receiver and the exact configuration of the network or other circumstances.

Figure 4:
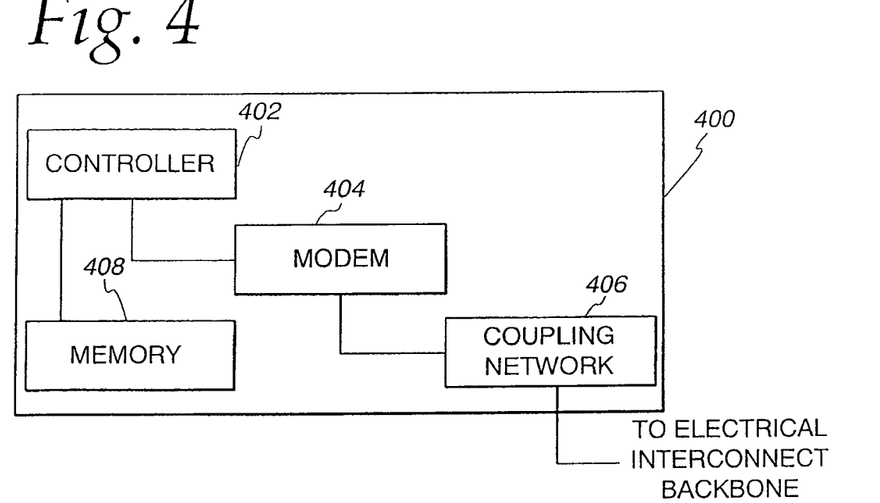
FIG. 4 comprises a block diagram of a fault determination apparatus according to various embodiments of the present invention.

Referring now to FIG. 4, one example of a transmitter or receiver 400 is described. The device 400 can be configured to operate as either a transmitter or receiver and includes a controller 402, a modem 404, a coupling network 406, and a memory 408.

If used as a transmitter, the controller 402 may form messages (e.g., packets) to send to a receiver via the modem 404 and coupling network 406. The modem 404 forms signals according to appropriate voltage levels or protocols and the coupling network 406 provides appropriate buffering and/or filtering capabilities that protect the modem 404 and controller 402 from electrical hazards (e.g., overvoltage conditions) present on the backbone and, at the same time, effectively inject the modulated signals into the backbone.

If used as a receiver, the coupling network 406 filters in only the modulated signal from the backbone and the modem 404 demodulates the signal into digital data and sends it to the controller 402. As a receiver, the device 400 may store in the memory 408 a table as has been described above with respect to FIG. 3. The controller 402 then may perform an analysis to determine the potential location or locations of faults within a particular network. Further, the controller 402 may be coupled to a port, which communicates with external devices to indicate to a user the presence and potential locations of faults. Further, the controller 402, modem 404, and/or coupling network 406 may be coupled to an external power supply.

Figure 5:
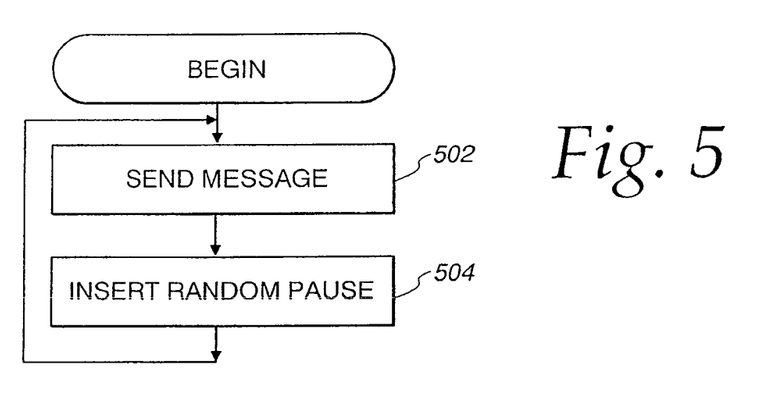
FIG. 5 comprises a flow chart of one approach for determining faults according to various embodiments of the present invention.

Referring now to FIG. 5, one example of a transmission arbitration protocol is described. At step 502, a message or packet is sent from a transmitter. For example, the message may be in the format as indicated in FIG. 2. At step 504, after the message is sent, a random pause duration is inserted after the message. Then, the same message is sent again, and this process continues, and to take one example, the receiver compares the received message to the expected message and determines that a fault exists if there is a mismatch. When a mismatch exists, a potential fault may exist in the portion of the network associated with the transmitter that sent the message.

Figure 6:
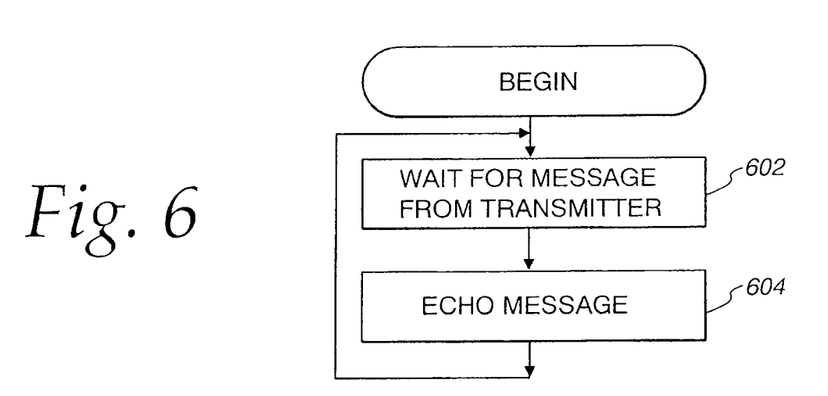
FIG. 6 comprises a flow chart of one approach for determining faults according to various embodiments of the present invention.

Referring now to FIG. 6, another example of a transmission arbitration protocol is described. At step 602, a transmitter waits to receive a message from a receiver. At step 604, after receiving a message the transmitter echoes the same message back to the receiver. Then, it waits for another command from the receiver. In the meantime, if the receiver never receives an echoed message back (e.g., after waiting for a predetermined time period) or the message returned to the receiver is in error (as would be indicated by a comparison of the received message with the expected message), then a fault (including open circuit) is indicated to exist.

Figures 7, 7A:
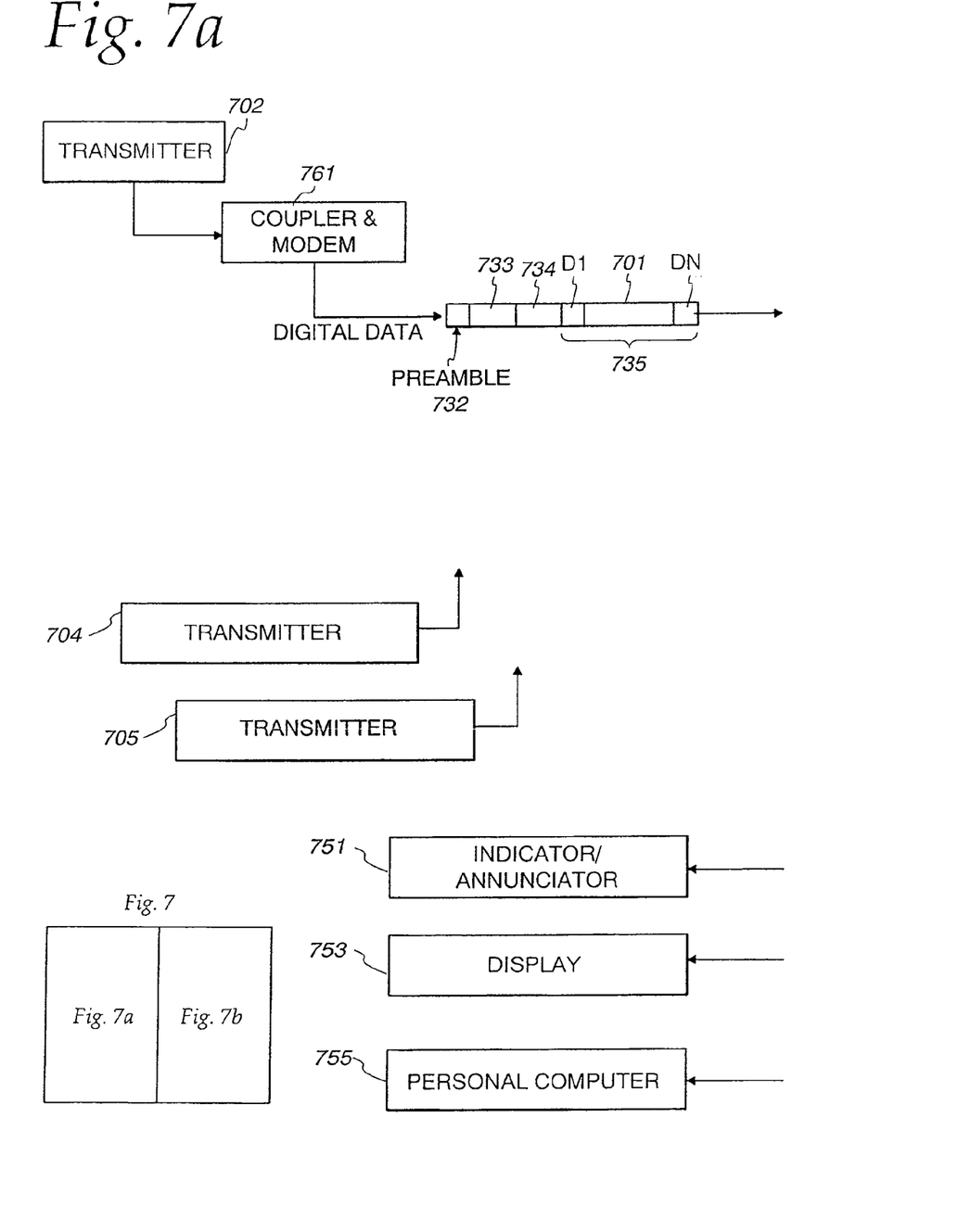
FIG. 7 comprises a block diagram and flow chart of one approach for determining electrical faults according to various embodiments of the present invention.
Figure 7B:
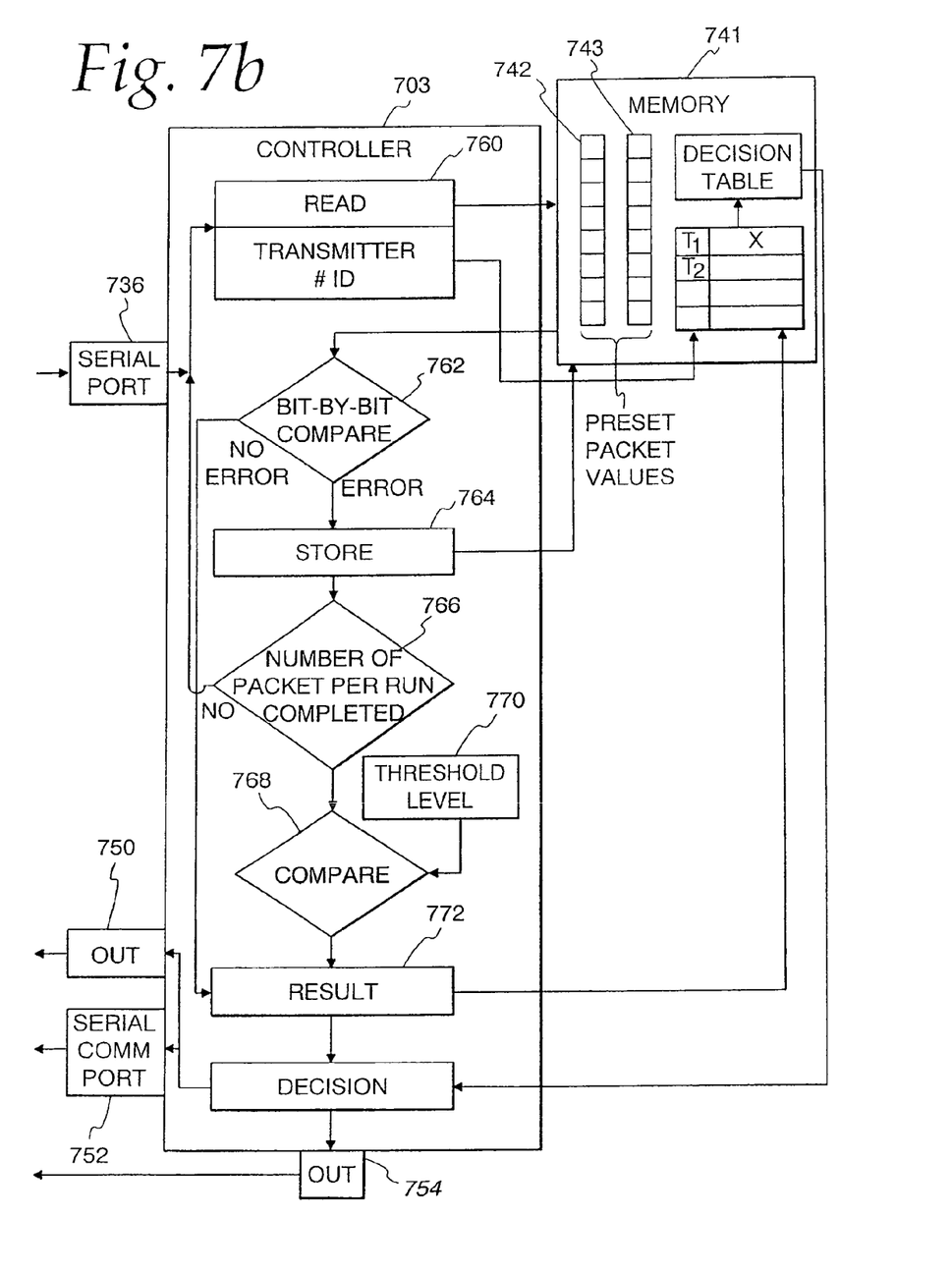

Referring now to FIG. 7, another example of approaches for fault determination is described. As shown in FIG. 7, through a coupling network and modem 761, a packet 701 (having pre-set values) is sent from transmitters 702, 704, and 705 to a controller 703 of a receiver, and read through serial communication port 736 of the controller 703.

The packet 701 includes, for example, preamble byte 732, and a transmitter identification byte 733, and a packet number byte 734, followed by n data bytes 735, D1 through Dn. N may be any integer value. In one example, n=24 and, consequently, 24 bytes of data are used. The rate of the data transmission, or bit rate, can become any speed or any modulation scheme suitable for the modem. In the some examples, a 2400 bps power line modem is used that provides approximately 130 kHz of Frequency Shift Keying (FSK) modulation. However, other numbers of data bytes may be used along with other bit rates and other modulation schemes. In some examples, a longer packet with slower bit rate with a modulation scheme may have better chance of intermittent fault detection than a shorter packet with higher bit rate with another modulation scheme.

The controller 703 of the receiver, after detecting the preamble byte 732, followed by identification byte 733, then reads the rest of the bytes (step 760) one at a time and stores the packet into internal memory space 741. In another part of the memory 741, the packet 701 is stored as a packet 742 and is used for a comparison with an expected (and previously stored) packet 743. The expected packet 743 includes the expected values of information for the packet 742. The packet information stored in memory can be compared against each of the transmitters.

The controller 703 at step 762 reads the stored packets 742 and 743 and makes a bit-by-bit comparison of all n data bytes against the pre-set values of the n data bytes between the packets 742 and 743. The first analysis is to decide which transmitter sent the packet and the subsequent analysis result for packet mismatch is stored and associated with the transmitter. If the two packets are the same, then the result of no error is registered for the transmitter. Then, with for example, the decision table of FIG. 3, a fault detection and location decision is made and displayed 753 or uploaded to an upper level computer 755. Then, the next packet sent from a transmitter is read at step 762.

At step 764, the error details (including the identity of the transmitter that sent the packet) may be stored. At step 766 it is determined if an adequate number of packets has been received in order to determine whether an alarm should be given a user. If the answer at step 766 is negative, control returns to step 760. If the answer is affirmative, execution continues at step 768 where a comparison is made with a threshold 770. If the number of erred packets exceeds the threshold, a result 772 is formed as a fault (e.g., "1") or no-fault (e.g., "0") result of a particular transmitter as in the table of FIG. 3. The final decision on fault determination using the table (stored in memory) is made and communicated to one or more of a port 750 (for display on an enunciator 751), a communication port 752 (for presentation on a display 753) and/or port 754 (for display on a personal computer 755). Depending upon the type of display, graphical images may be formed to be displayed on some or all of the mentioned external devices.

As described herein, a pause may be inserted between transmitted packets. In one example, the pause between two consecutive packets, in a system using a microcontroller of 8-bits and 20 MHz speed, is about 100 milliseconds. The pause time is selected so as to be sufficient for processing to occur. For example, the pause duration may be selected to allow for the fault determination process to finish and also for error messages to be sent to external devices (e.g., the enunciator 751, the display 753, and/or the personal computer 755). The pause duration can also include time to allow processing to occur for a given number of packets, for example, 1000 packets.

The threshold level of the rate of error that initiates the fault (e.g., "1") or no-fault (e.g., "0") can be any predetermined value or, alternatively, be determined after a run of the system under clean electrical wire status. Further, the threshold can be automatically determined using the error rate by comparing the error rates during actual/normal operating status and those of actual intermittent fault status. Before deploying the above-mentioned approaches, a test run may be executed in a staged intermittent fault condition that sets the threshold level for a fault or no-fault boundary, and thus increases the detection probability while at the same time decreasing false alarm and nuisance readings.

Various error rates can be determined. For example, a first error type that can be calculated is a Net Packet Error Rate (NPER), which is the percentage of packets that contained errors out of the total number of received packets. In the NPER case, the lost packets by the error in identification byte(s) are ignored.

Alternatively, a Total Packet Error Rate (TPER), can be calculated. This rate is the percentage of the number of packets received with error out of the total number packets sent.

In another example, a Net Byte Error Rate (NBER) can be calculated. The NBER is the percentage of the number of packets received with just 1 data byte error caused by 1 or 2 bit errors in the byte out of the received packets with no error. The NBER focuses, unlike NPER or TPER, on very short disruptions. Very short disruptions in time rooted from an intermittent fault may cause error in a bit or two in a byte data, not across the data bytes.

Yet another alternative error rate that can be determined is the Total Byte Error Rate (TBER), which is the percentage of the number of packets received with 1 data byte error caused by 1 or 2 bit errors in the byte out of the total number of packets sent. The TBER ignores any disruptions which are long enough to cause errors in multiple data bytes. This rate does not include or consider long disruptions possibly caused by normal switching operations and, as such, could reduce the number of false alarms.

Figure 8:
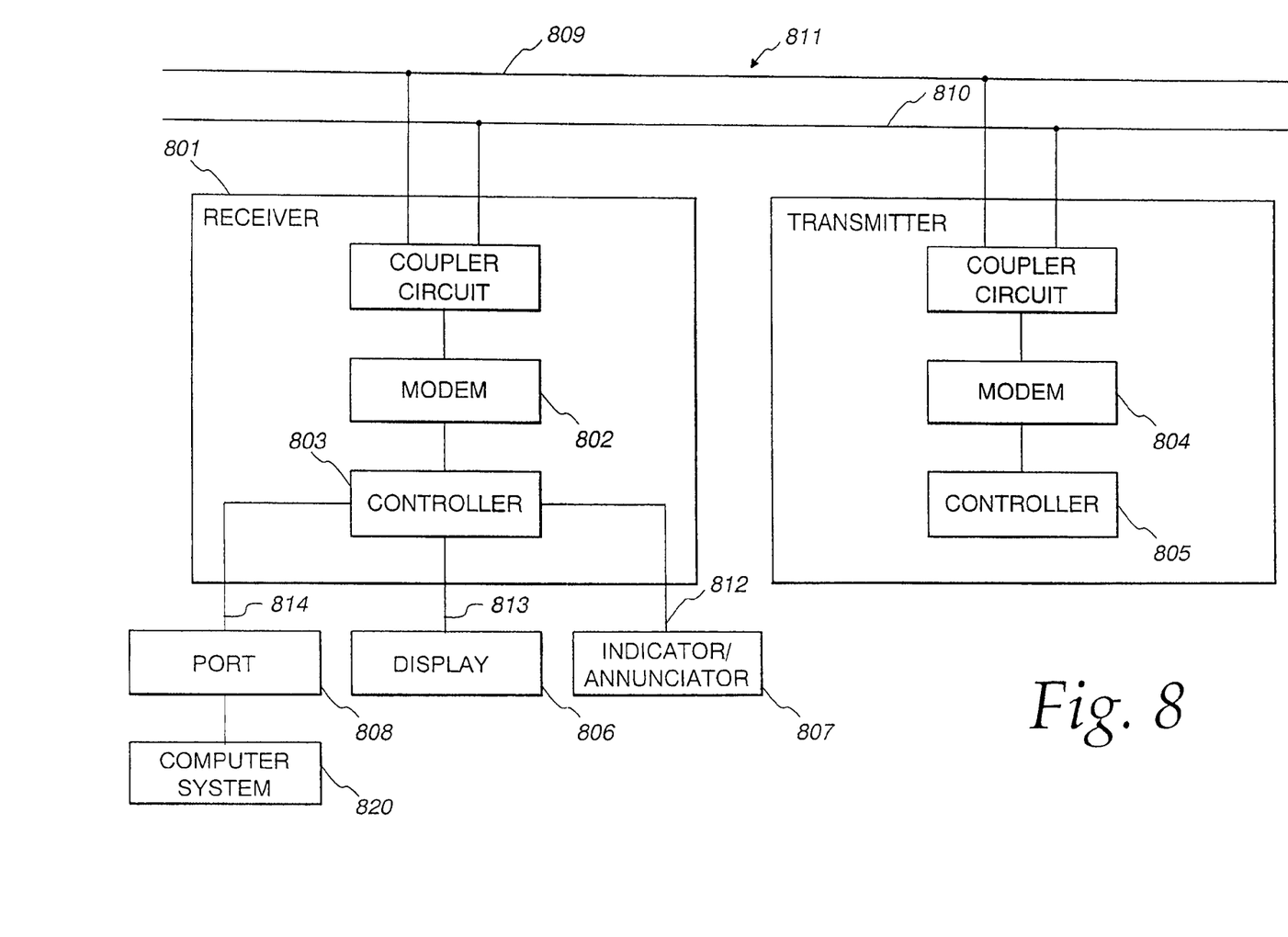
FIG. 8 comprises a block diagram of a transmitter and receiver according to various embodiments of the present invention.

Referring now to FIG. 8, a receiver 801 receives packets over electrical wires 810 and 811 that are transmitted by a transmitter 802. If the electrical wire carries DC current, then one of the wires 810 or 811 can be a ground wire. In the example of FIG. 8, both the receiver 801 and the transmitter 802 have the same functional structure and includes a power line modem 802 or 804 and a controller 803 or 805. The receiver 801 includes additional interface outputs or ports 812, 813 and 814. The output 813 is connected to an indicator/enunciator 807 to send an alarm when an intermittent fault is detected. This may be in the form of blinking light (e.g., light emitting diode (LED)) and/or audible indication. The port 813 is used to display the alarm condition on a display 806 (e.g., a liquid crystal display (LCD)) with texts and graphics. The output 814 is further used to send the alarm condition to a computer system 820 via serial communication port 808 for displaying on a computer screen or for further analysis of the alarm condition data. The errors and error rates discussed herein can be displayed according to any of the display approaches described herein.

The transmitter 802 includes the power line modem 804 and the controller 805. The controller 805 is a microcontroller or microprocessor which includes computing code, controls digital logic, and sends bytes of digital data (e.g., packets). The computing code manages the number of packets sent and how often the packets are sent.

Figure 9:
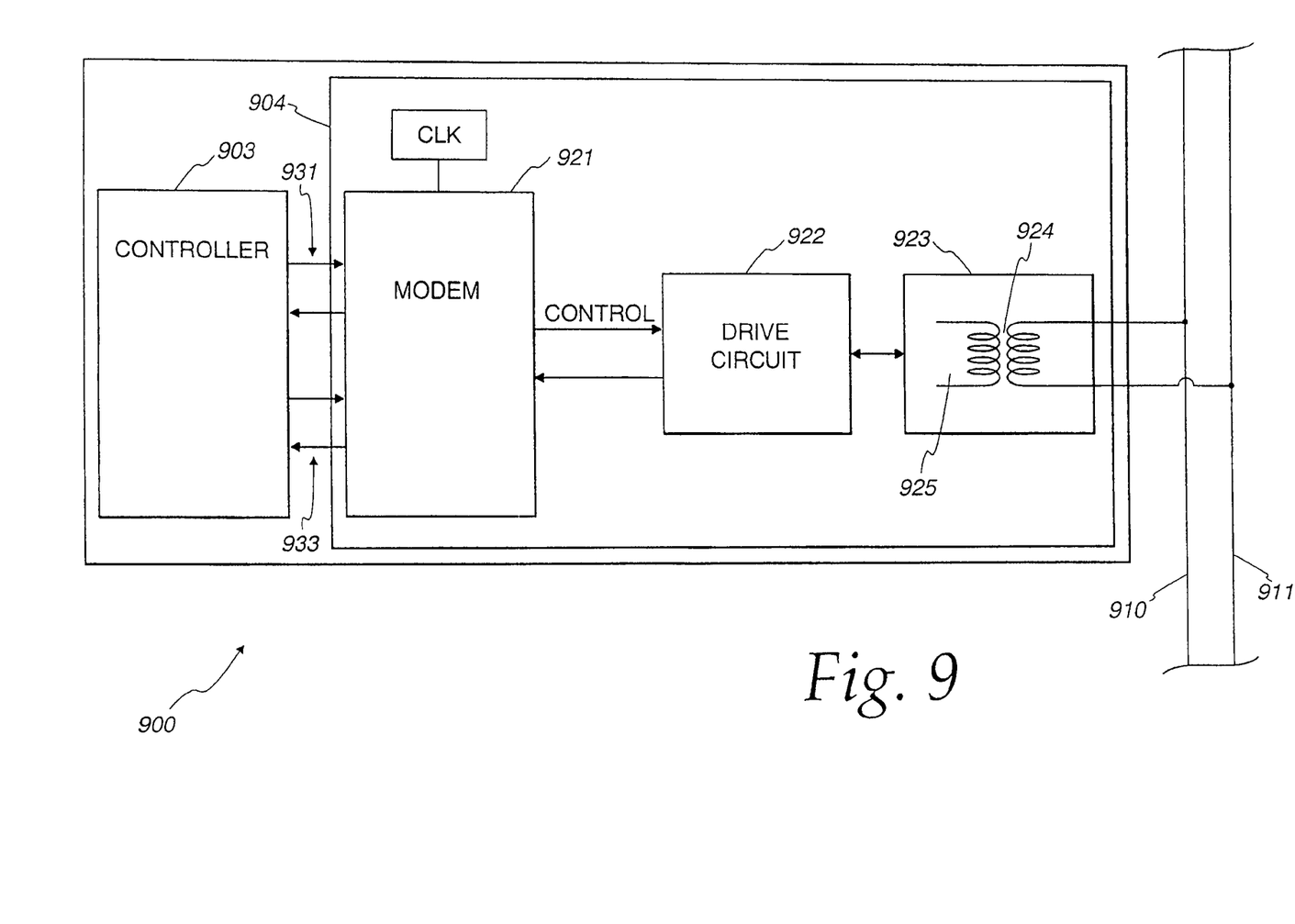
FIG. 9 comprises a block diagram of a transmitter or a receiver according to various embodiments of the present invention.

Referring now to FIG. 9, one example of a transmitter 900 is described. A power line modem 921 in the transmitter 900 receives the serially transmitted digital data stream from a controller 903, converts the digital data to analog data, and modulates the analog data in FSK (Frequency Shift Keying) scheme (in which digital logic 1 is coded to analog signal of a certain frequency and digital logic 0 is to another frequency). The modulated signal is amplified by an amplifier 922 and sent through a coupler 923, which sends the modulated signals and blocks all other signals outside the frequency band, to the electrical wires 910 and 911.

The modem 921 may be any commercially available modem chip. The modem 921 may include a filter that band passes only the frequency band used in the particular FSK scheme that is employed. The modem 921 has four control and data communication lines with the controller 903. These include RX control 930 for controlling the reception of digital data, TX control 931 for controlling the transmission of digital data, carrier detect (CD) control 932 for indicating to the controller 903 if and when the modem 922 receives a modulated signal from an electrical wire, and RX/TX control 933 for indicating if a digital signal has been received and is to be transmitted.

A modulated signal automatically is transmitted from the modem 921 and amplified by the amplifier circuit 922. The amplified modulated signal then is presented to the electrical wires via a coupler 923, which passes the signals of the frequency band and blocks all other signals. The coupler 923, in one example, is a transformer coil 924 with filtering capacitors 925 and 926. In one approach, the structure of the receiver is identical (or nearly identical with the receiver having ports to communicate with external devices) with the structure of the transmitter 900.

Various transmission protocols may be used. For example, a byte of any data can be sent from the receiver to indicate to the transmitter to send data.

A packet may be sent to the receiver with various bytes of data. For example, a preamble byte may be included. The next byte is sent to identify the transmitter and the receiver. To take one example, if the identification byte is a preset data value such as a byte data of 10110011, then the receiver checks if the received identification byte is 10110011. If the received identification byte is the same as the preset data, then the receiver is now ready to receive the data stream that follows. One or more bytes can be used for identification purposes.

As mentioned, in one example, the group of data bytes including the preamble, identification, and actual data form a packet. In one approach, one packet is transmitted from a transmitter and reception of the same one packet made by a receiver. In one approach, the transmitter transmits the same one packet repeatedly, with a pause between two packets, until, for example, a set number of packets are sent (e.g., 956 packets). Then, packet transmission resumes. Under an intermittent fault condition, the preamble byte may be noised out, or the identification byte may be contaminated, then the receiver ignores the packet with the contaminated identification byte since the packet is interpreted as not meant to be sent to the receiver. In this case, one packet is lost and a packet error exists.

Thus, approaches are provided to detect the presence and locations of faults within an existing electrical network. The approaches utilize one or more transmitters to send signals (e.g., packets) to one more receivers and based upon the signal received at the receiver, to determine the presence and location of electrical faults. The approaches described herein are easy and cost effective to use, do not rely upon the transmission of high voltage signals, can be implemented at any place within the electrical system, and are not susceptible to false results as have been obtained in previous approaches.

While the invention herein disclosed has been described by means of specific embodiments and applications thereof, numerous modifications and variations could be made thereto by those skilled in the art without departing from the scope of the invention.

What is claimed is:

1. A method of determining intermittent electrical faults comprising:
    transmitting signals from a plurality of transmitters that are positioned in an electrical network;
    receiving the signals transmitted by each of the plurality of transmitters at a single receiver positioned within the electrical network;
    at the single receiver, analyzing the received signals and determining from the analyzing of the received signals whether a fault has occurred in the electrical network and an approximate location of the fault within the electrical network;
    wherein the transmitting comprises transmitting from one of the plurality of transmitters a unique combination of bits that uniquely identifies the one of the plurality of transmitters; and
    further comprising the receiver analyzing the unique combination of bits and comparing the combination of bits to an expected combination of bits and when there is not a match, determining that the electrical fault exist.

2. A fault determination apparatus comprising:
    a plurality of transmitters, each of the plurality of transmitters configured to transmit signals across at least a portion of an electrical network;
    a single receiver communicatively coupled to the plurality of transmitters and the electrical network, the single receiver configured to receive the signals transmitted by each of the plurality of transmitters and to analyze the received signals and determine from analyzing the received signals when a fault has occurred in the electrical network and an approximate location for the fault;

wherein each of the plurality of transmitters has a unique combination of bits that identifies each transmitter and the unique combination of bits is included in signals sent to the single receiver;

wherein the single receiver is configured to analyze the received bits and to perform a comparison between the received bits to expected bits and when a match does not exist between the received bits and the expected bits, to determine that a fault exists.

3. The apparatus of claim 1 wherein the single receiver is configured to determine the location of the fault based upon the comparison between the received bits and the expected bits.

4. A method of determining intermittent electrical faults comprising:

at a single receiver positioned within an electrical network:

receiving signals transmitted by each of a plurality of transmitters disposed within the electrical network;

analyzing the received signals and determining from the analyzing of the received signals whether a fault has occurred in the electrical network and an approximate location of the fault within the electrical network;

wherein receiving the signals comprises receiving a unique combination of bits that uniquely identifies one of the plurality of transmitters; and further comprising the single receiver analyzing the unique combination of bits and comparing the unique combination of bits to an expected combination of bits and when there is not a match, determining that an electrical fault exist.

* * * * *